UNITED STATES PATENT OFFICE.

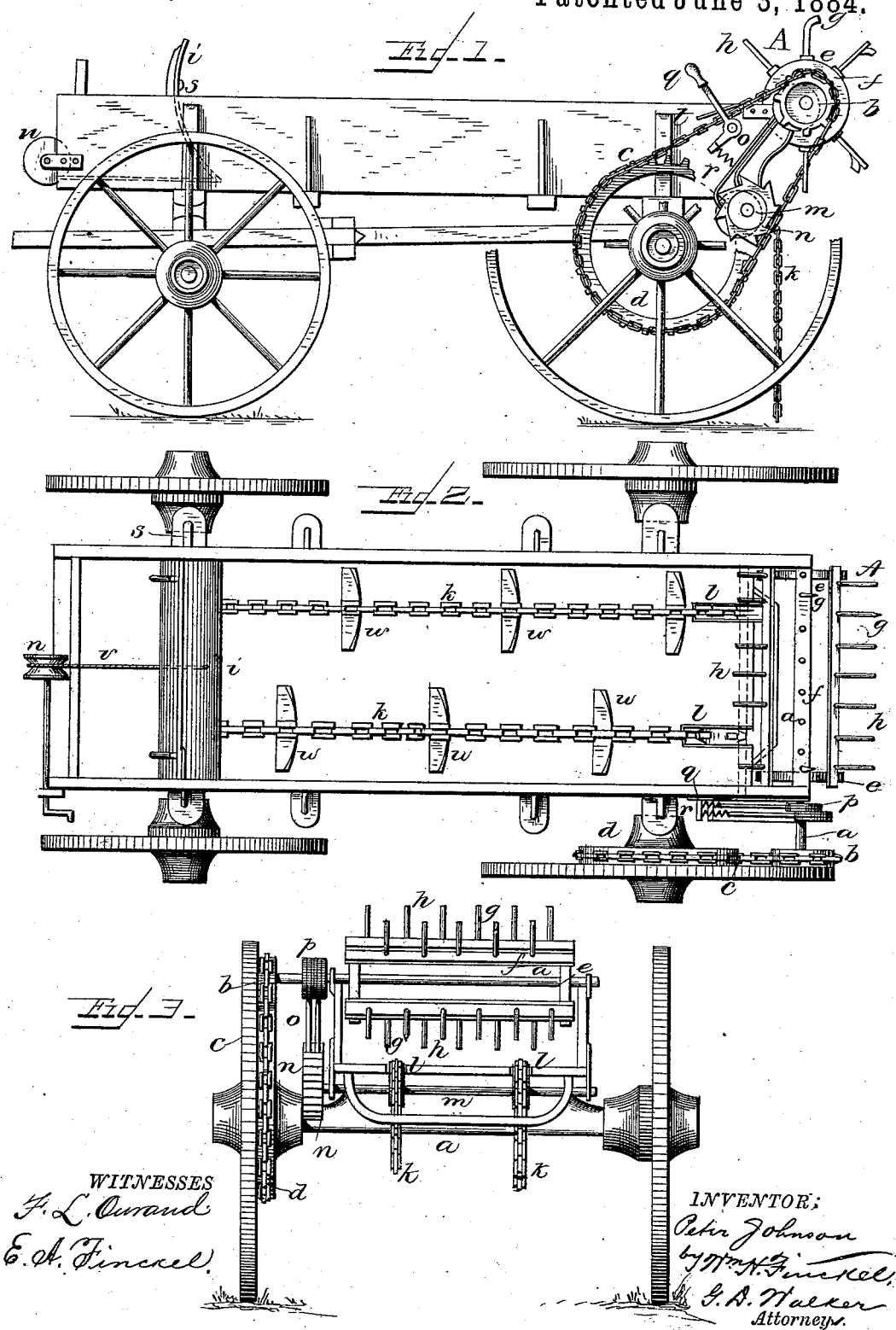

PETER JOHNSON, OF DASSEL, MINNESOTA.

MANURE PULVERIZER AND DISTRIBUTER.

SPECIFICATION forming part of Letters Patent No. 299,648, dated June 3, 1884.

Application filed September 10, 1883. (No model.)

*To all whom it may concern:*

Be it known that I, PETER JOHNSON, of Dassel, in the county of Meeker and State of Minnesota, have invented a new and Improved Manure Pulverizer and Distributer, of which the following is a specification.

My improvements relate to apparatus for distributing pulverized manure from wagons, the object being to provide devices that can be readily attached to any wagon, and which shall act to thoroughly pulverize and distribute the material in any quantity, as desired.

To these ends my invention consists in a scraper for moving the manure on the wagon and a rotary pulverizer and distributer, both of which are operated by connections from the wagon-wheels, and change-gearing provided for regulating the rapidity of discharge, all as hereinafter described and claimed.

Reference is to be had to the accompanying drawings, wherein similar letters of reference indicate the same parts.

In the drawings, Figure 1 is a side elevation of a wagon provided with my improved apparatus, one wheel of the wagon being broken away. Fig. 2 is a plan view of the wagon and parts, and Fig. 3 is an end view of the same.

The vehicle represented is an ordinary box-wagon; but the apparatus may be applied to any style of wagon. At the tail end, in suitable bearings, is a cross-shaft, $a$, having at one end a chain-wheel, $b$, which is connected by an endless chain, $c$, to a larger chain-wheel, $d$, that is attached to one of the rear wheels of the wagon. The shaft $a$ carries the distributer $A$, that consists of heads $e\ e$ and bars $f\ f$, the latter being provided with knives $g$ and pins $h$, for cutting up and scattering the material. The knives and pins project, so as to operate in the discharge end of the wagon upon the manure as it is pushed backward, and I arrange the knives in spiral form or order upon the bars $f$ and set the pins "staggering," so that every portion of the manure shall be acted upon; and the knives or cutters $g$ have their ends curved backward, so that they will act with a shearing cut on the material, thus insuring pulverization. The scraper $i$ is of concave form, and is attached to supports or brackets $i'$, that rest on the wagon-bottom, so that the scraper is held up and may slide with the brackets, and from the front of the scraper chains $k\ k$ extend along the wagon-bottom to chain-wheels $l\ l$, that are fixed on a cross-shaft, $m$, so that when the shaft is rotated the chains will be drawn upon and the scraper thus pulled along. On one end of shaft $m$ is a ratchet-wheel, $n$, and pawls $o\ o$, connected with eccentrics $p\ p$ on shaft $a$, are arranged to act on the teeth of the ratchet-wheels, so as to give an intermittent rotation to shaft $m$, the extent of motion at each movement being determined by the size of the ratchet-wheel. The eccentrics are placed reversely, so that each causes a movement of the ratchet-wheel, and two movements are given in each revolution of the shaft $a$. The ratchet-wheel is to be attached by a key or other device that will allow ready removal for the substitution of a larger or a smaller wheel, according to the number of loads to an acre that are to be distributed; and in case it is desirable to vary the amount for a short time only, (for instance on hilly ground,) there may be differental ratchets fitted to slide on shaft $m$, and a lever provided for shifting either from beneath the pawls. This arrangement of change-gearing allows variation in the amount distributed without changing the speed of the revolving distributer.

At $q$ on the wagon is a lever connected by spiral springs $r$ to the pawls $o$, and the longer arm of the lever extends above the side of the box, for being moved by hand to raise the pawls from the ratchet, or by a pin, $s$, that projects from the side of the scraper $i$. The pin $s$ acts when the scraper reaches the rear of the box, so as to prevent the scraper from being moved into the way of the cutters, and also to allow of the scraper being drawn back. The springs $r$ allow rise and fall of the pawls, and also press them into contact with the ratchet. To hold the lever $q$ up a friction-plate, $t$, is attached on the side of the box.

For dragging the scraper back a windlass, $u$, is fitted on the front end of the wagon-box, and a rope, $v$, passes from the windlass to the scraper, to which it is attached. At intervals on chains $k$ are side plates, $w$, turned up to form scrapers or conveyers that take hold upon the material, so as to assist its movement and relieve the scraper $i$ to some extent. The chains run to the ground as they are drawn out, and a guard, *a'*, is fixed across the wagon at the rear to prevent the chains from being drawn out of connection with the wheels.

In operating the apparatus the scraper is placed at the front of the box, the box then filled with manure, and the wagon is then to be drawn across the land to be manured. As the wagon moves along the scraper moves slowly back, and the whole body of manure being thus pushed to the rear a continuous feed is supplied to the pulverizer and distributer, and the material thus scattered in a pulverized condition with uniformity and in quantity as desired.

It will be seen that the parts forming the apparatus are comparatively few and of inexpensive character, and that they can be put on and taken off readily.

I am aware that manure distributers or spreaders have been patented heretofore; but the bottom of the vehicle for carrying the manure was bodily movable to feed the manure to the distributer or spreader.

Having thus described my invention, what I claim as new, and desire to secure by Letters Patent, is—

1. The combination, with the ordinary wagon having a fixed or closed bottom, of the shaft *a*, journaled at the rear end of said wagon, heads *e*, and bars *f*, the latter having the pins *h* and knives *g* thereon, the eccentrics *p*, and spring-pressed pawls *o* on said shaft, the scraper *i*, chains *k*, connected therewith, the shaft *m*, having chain-wheels *l* thereon, and also the ratchet-wheel *n*, to be operated by pawls *o*, and the gearing, substantially as shown, for rotating the shaft *a*, and consequently the shaft *m*, all operating as set forth.

2. In a manure-distributing wagon, substantially as described, the distributing-wheel A at the rear end of the wagon-body, and having cutters or knives *g* and pins *h* thereon, for the purposes specified.

3. The combination, in a manure-distributer constructed as shown and described, of the scraper *i*, chains *k*, connected to said scraper, and the auxiliary plates *w* on said chain, for the purpose set forth.

PETER JOHNSON.

Witnesses:
C. A. McCollom,
L. W. Leighton.